United States Patent
Lee et al.

(10) Patent No.: US 9,642,083 B2
(45) Date of Patent: May 2, 2017

(54) METHOD AND APPARATUS FOR CONFIGURING TIMER IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 14/428,895

(22) PCT Filed: Sep. 26, 2013

(86) PCT No.: PCT/KR2013/008616
§ 371 (c)(1),
(2) Date: Mar. 17, 2015

(87) PCT Pub. No.: WO2014/051346
PCT Pub. Date: Apr. 3, 2014

(65) Prior Publication Data
US 2015/0237576 A1    Aug. 20, 2015

Related U.S. Application Data (60) Provisional application No. 61/706,109, filed on Sep. 26, 2012, provisional application No. 61/705,635, filed on Sep. 26, 2012.

(51) Int. Cl.
*G08C 17/00* (2006.01)
*H04W 52/02* (2009.01)
(Continued)

(52) U.S. Cl.
CPC ....... *H04W 52/0209* (2013.01); *H04W 56/00* (2013.01); *H04W 76/046* (2013.01)

(58) Field of Classification Search
None
See application file for complete search history.

(56) References Cited

U.S. PATENT DOCUMENTS

2007/0286080 A1    12/2007    Kim et al.
2011/0188481 A1*    8/2011    Damnjanovic ....... H04W 72/04
                                                            370/336
(Continued)

FOREIGN PATENT DOCUMENTS

WO    2012115419 A2    8/2012
WO    2014020569 A1    2/2014

OTHER PUBLICATIONS

Change Request, ZTE: "Introduction of 'Power preference indication' (option a + RRC signaling)", 3GPP TSG-RAN WG2 Meeting #79, R2-123414, Aug. 13-17, 2012.
(Continued)

*Primary Examiner* — Nicholas Sloms
(74) *Attorney, Agent, or Firm* — Dentons US LLP (57) ABSTRACT

A method and apparatus for transmitting an indication in a wireless communication system is provided. A user equipment (UE) transmits a first indication according to a first configuration, starts a timer prohibiting transmission of another indication, receives a second configuration, and configures a second indication according to the second configuration after the timer expires.

12 Claims, 8 Drawing Sheets

(51) Int. Cl.
*H04W 56/00* (2009.01)
*H04W 76/04* (2009.01)

(56) References Cited

U.S. PATENT DOCUMENTS

| | | |
|---|---|---|
| 2011/0195668 A1 | 8/2011 | Lee et al. |
| 2012/0057490 A1 | 3/2012 | Park et al. |
| 2012/0252442 A1* | 10/2012 | Fu .................. H04W 24/10 455/426.1 |
| 2015/0195848 A1* | 7/2015 | Hong ................ H04W 72/1215 455/450 |

OTHER PUBLICATIONS

Ericsson, ST-Ericsson: "Further details on UE assistance for power preference", 3GPP TSG-RAN WG2 #79, Tdoc R2-123763, Aug. 13-17, 2012.
Research in Motion UK Limited: "Details of Power Preference Indication", 3GPP TSG-RAN WG2 Meeting #79, R2-123732, Aug. 13-17, 2012.

* cited by examiner

METHOD AND APPARATUS FOR CONFIGURING TIMER IN WIRELESS COMMUNICATION SYSTEM

This application is a 35 U.S.C. §371 National Stage Entry of International Application No. PCT/KR2013/008616 filed Sep. 26, 2013, which claims benefit of and priority to U.S. Provisional Application No. 61/706,109 filed Sep. 26, 2012 and 61/705,635 filed Sep. 26, 2012, all of which is incorporated by reference for all purposes as if fully set forth herein.

BACKGROUND OF THE INVENTION

Field of the Invention

The present invention relates to wireless communications, and more particularly, to a method and apparatus for configuring a timer in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

For informing a network of a user equipment (UE)'s power saving preference, a power preference indication may be transmitted. Above this, various types of UE-originated indications, such as an in-device coexistence (IDC) indication, a proximity indication, and a multimedia broadcast multicast services (MBMS) interest indication, may be transmitted from the UE to the network.

However, if these UE-originated indications are transmitted frequently, signaling overhead may occur. To prevent the signaling overhead due to the transmission of the UE-originated indications, a prohibit timer may be configured. If UE transmits the UE-originated indication, then the timer starts. And while the timer is running, another transmission of the UE-originated indication may be prevented.

How a UE handles a running prohibit timer is not specified upon reception of a reconfiguration message.

SUMMARY OF THE INVENTION

The present invention provides a method and apparatus for configuring a timer in a wireless communication system. The present invention provides a method for handling a running prohibit timer upon reception of a reconfiguration message.

In an aspect, a method for transmitting an indication in a wireless communication system is provided. The method includes transmitting a first indication according to a first configuration, starting a timer prohibiting transmission of another indication, receiving a second configuration, and configuring a second indication according to the second configuration after the timer expires.

The first configuration and the second figuration may include a timer.

The second configuration may be received while the timer included in the first configuration is running.

The first indication and the second indication may be one of a power preference indication, an in-device coexistence (IDC) indication, a proximity indication, and a multimedia broadcast multicast services (MBMS) interest indication.

The first configuration and the second configuration may be received via an RRC connection reconfiguration message.

The first indication may be transmitted via a dedicated control channel (DCCH).

The UE may be in radio resource control (RRC) connected mode.

In another aspect, a user equipment (UE) in a wireless communication system is provided. The UE includes a radio frequency (RF) unit for transmitting or receiving a radio signal, and a processor coupled to the RF unit, and configured to transmit a first indication according to a first configuration, start a timer prohibiting transmission of another indication, receive a second configuration, and configure a second indication according to the second configuration after the timer expires.

Upon reception of a reconfiguration message, operations of a running prohibit timer can be specified clearly.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
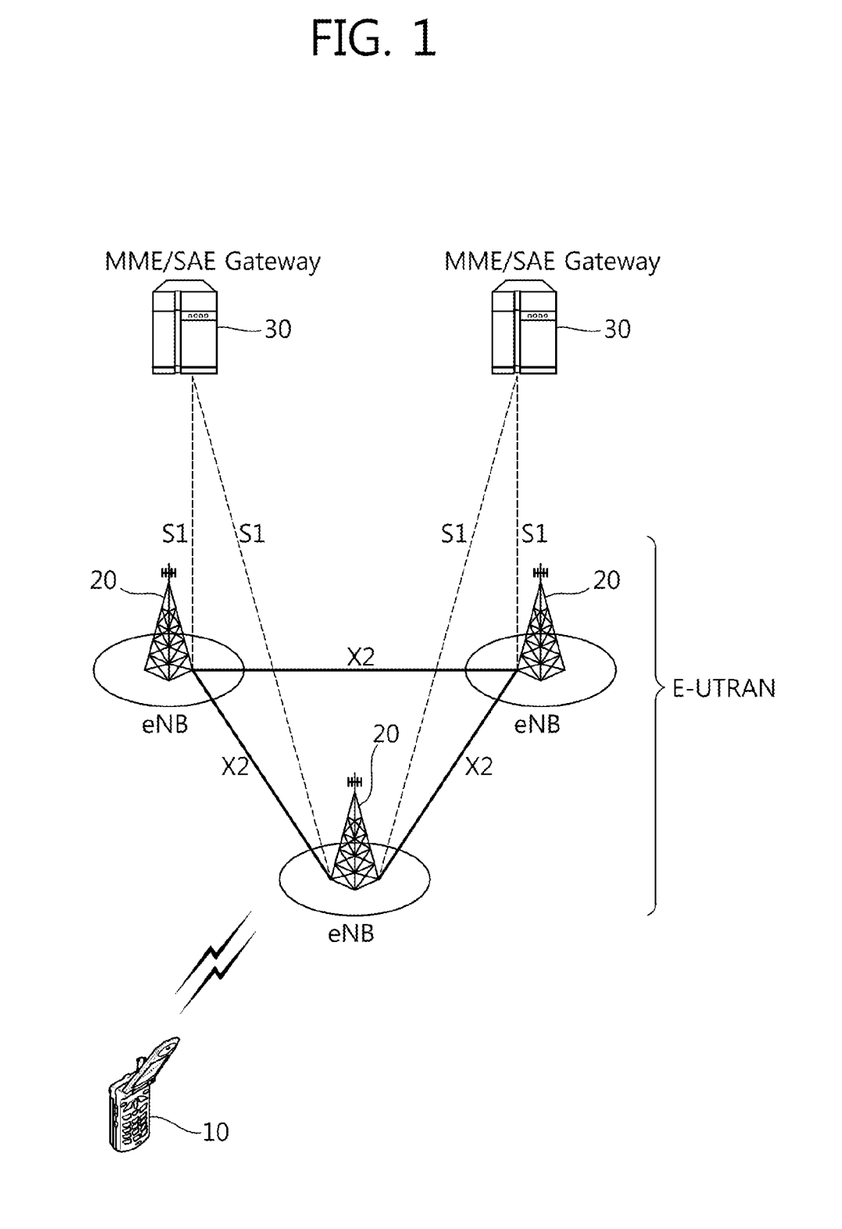
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
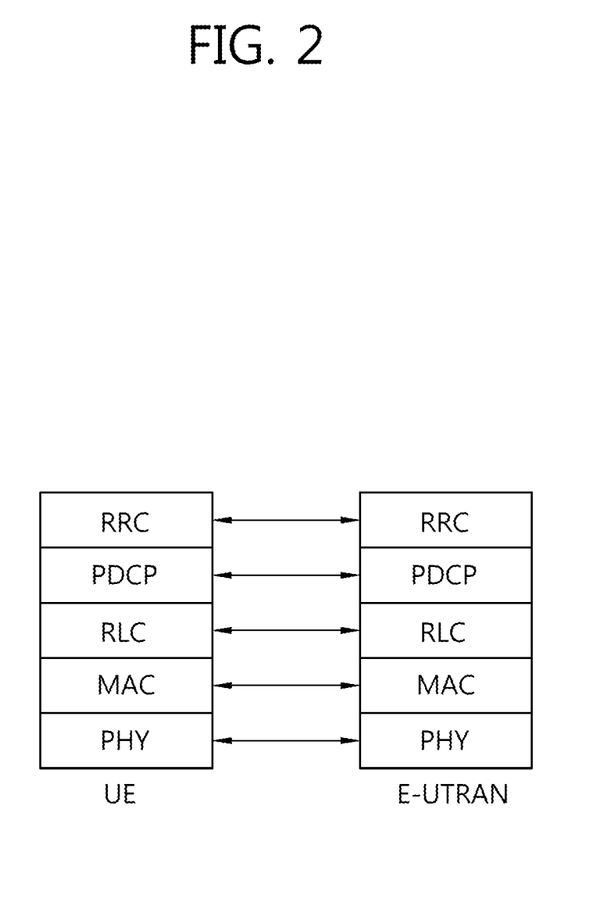
FIG. 2 is a diagram showing radio interface protocol architecture for a control plane.
Figure 3:
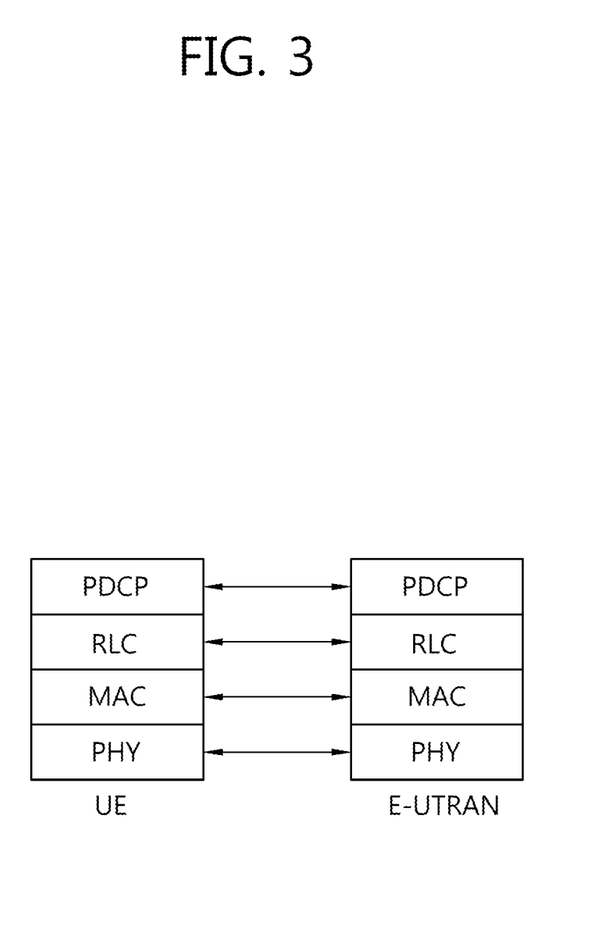
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
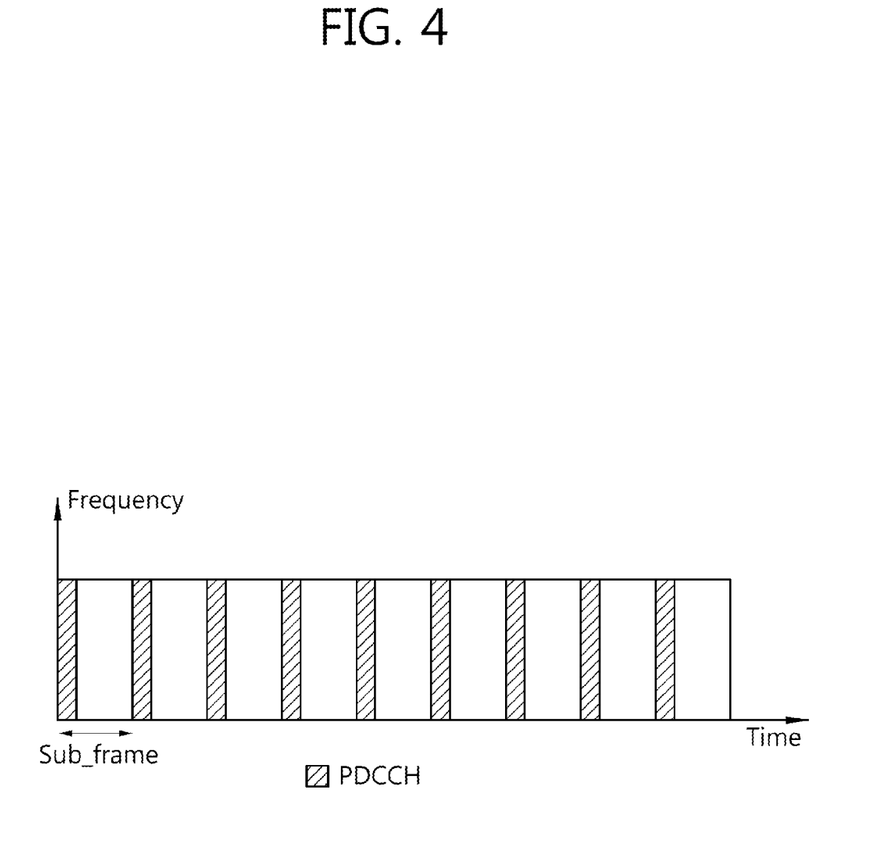
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another radio access technology (RAT) in inter-RAT cell reselection.

A power preference indication and UE assistance information is described below.

Figure 5:
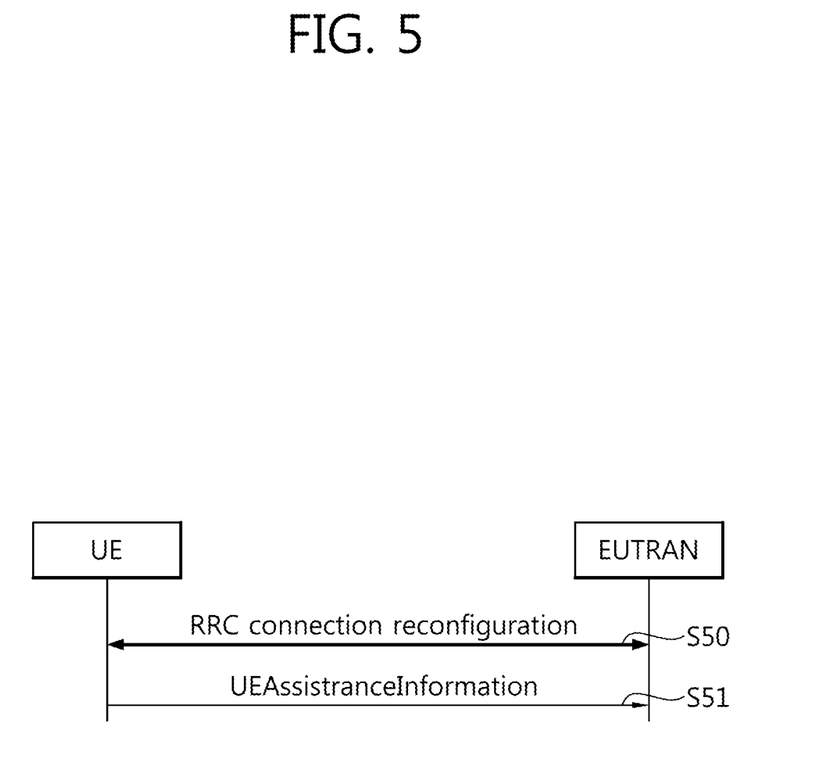
FIG. 5 shows an example of a UE assistance information procedure.

During handover, if the RRCConnectionReconfiguration message includes the mobilityControlInfo and the UE is able to comply with the configuration included in this message, the UE shall:

1> if the RRCConnectionReconfiguration message includes the powerPrefIndicationConfig:

2> perform the power preference indication procedure;

During reconfiguration, if the UE is able to comply with the configuration included in the RRCConnectionReconfiguration message, the UE shall:

1> if the RRCConnectionReconfiguration message includes the powerPrefIndicationConfig:

2> perform the power preference indication procedure;

FIG. 5 shows an example of a UE assistance information procedure. The purpose of this procedure is to inform the E-UTRAN of the UE's power saving preference. The E-UTRAN may assume that the UE prefers a default configuration for power saving initially when it configures and enables the UE for power preference indication.

Referring to FIG. 5, at step S50, the UE and the E-UTRAN performs an RRC connection reconfiguration procedure. At step S51, the UE transmits a UE assistance information (UEAssistanceInformation) message to the E-UTRAN.

A UE capable of providing power preference indications in RRC_CONNECTED may initiate the procedure only if:

1> the received powerPrefIndicationConfig includes the powerPrefIndication-Enabled; and 1> the UE did not indicate any power saving preference since last entering RRC_CONNECTED on the current Pcell, or the current UE preference is different from the one indicated in the last transmission of the UEAssistanceInformation message to the current Pcell; and 1> timer T340 is not running.

It is for further study whether the first transmission of the powerPrefIndication is restricted so that it can only be set to lowpowerconsumption.

Upon initiating the procedure, the UE shall:

1> if the UE prefers a default configuration for power saving:

2> start timer T340 with the timer value set to the powerPrefIndication-Timer;

1> initiate transmission of the UEAssistanceInformation message;

It is for further study whether T340 is started also in case where the UE prefers a configuration that is primarily optimized for power saving.

The UE shall set the contents of UEAssistanceInformation message as follows:

1> if the UE prefers a default configuration for power saving:

2> set powerPrefIndication to default;

1> else if the UE prefers a configuration primarily optimized for power saving:

2> set powerPrefIndication to lowpowerconsumption;

The UE shall submit the UEAssistanceInformation message to lower layers for transmission.

Table 1 shows an example of the UEAssistanceInformation message. A signalling radio bearer for the UEAssistanceInformation message may be an SRB1, and a logical channel on which the UEAssistanceInformation message is transmitted may be a dedicated control channel (DCCH).

TABLE 1

```
-- ASN1START
UEAssistanceInformation ::= SEQUENCE {
criticalExtensions           CHOICE {
c1                           CHOICE {
ueAssistanceInformation-r11              UEAssistanceInformation-r11-IEs,
spare7 NULL, spare6 NULL, spare5 NULL, spare4 NULL, spare3 NULL,
spare2 NULL, spare1 NULL
},
criticalExtensionsFuture      SEQUENCE { }
}
}
UEAssistanceInformation-r11-IEs ::= SEQUENCE {
powerPrefIndication-r11      PowerPrefIndication-r11
OPTIONAL,
nonCriticalExtension                             SEQUENCE    { }
OPTIONAL
}
-- ASN1STOP
```

Referring to Table 1, the UEAssistanceInformation message includes the PowerPrefIndication information element (IE). Table 2 shows an example of the PowerPrefIndication IE. The PowerPrefIndication IE is used to provide information related to the UE power saving preference.

TABLE 2

```
-- ASN1START
PowerPrefIndication-r11 ::= ENUMERATED {default,
lowpowerconsumption}
-- ASN1STOP
```

Referring to Table 2, 'default' indicates the UE preference for a default configuration for power saving. 'lowpowerconsumption' indicates the UE preference for a configuration that is primarily optimized for power saving.

Table 3 shows an example of the OtherConfig IE. The OtherConfig IE contains configuration related to other configuration, e.g. a power preference indication configuration (powerPrefIndicationConfig).

TABLE 3

```
-- ASN1START
OtherConfig-r9 ::= SEQUENCE {
reportProximityConfig-r9 ReportProximityConfig-r9 OPTIONAL,  -- Need ON
...,
[[ powerPrefIndicationConfig-r11 PowerPrefIndicationConfig-r11 OPTIONAL,  -- Need ON
]]
}
ReportProximityConfig-r9 ::= SEQUENCE {
proximityIndicationEUTRA-r9 ENUMERATED {enabled} OPTIONAL, -- Need OR
proximityIndicationUTRA-r9 ENUMERATED {enabled} OPTIONAL -- Need OR
}
PowerPrefIndicationConfig-r11 ::= SEQUENCE {
powerPrefIndication-Enabled-r11 ENUMERATED {enabled} OPTIONAL, -- Need OR
powerPrefIndication-Timer-r11 ENUMERATED {s0, s0dot5, s1, s2, s5, s10, s20, s30, s60,
s90, s120, s300, s600, spare3, spare2, spare1}
} OPTIONAL, -- Cond ppiENABLED
-- ASN1STOP
```

Referring to Table 3, the OtherConfig IE includes the PowerPrefIndicationConfig IE, and the PowerPrefIndicationConfig IE includes the powerPrefIndication-Enabled field and the powerPrefIndication-Timer field. The powerPrefIndication-Enabled field is used to indicate whether the power preference indication reporting from the UE is allowed or not. The powerPrefIndication-Timer is a prohibit timer for the power preference indication reporting. For example, value s0 means that the prohibit timer is set to 0 second or not set, value s0dot5 means that the prohibit timer is set to 0.5 second, and value s1 means that the prohibit timer is set to 1 second and so on. The powerPrefIndication-Timer field is mandatory present in case that the powerPrefIndication-Enabled is present; otherwise the powerPrefIndication-Timer field is not present.

An in-device coexistence (IDC) indication is described below.

Figure 6:
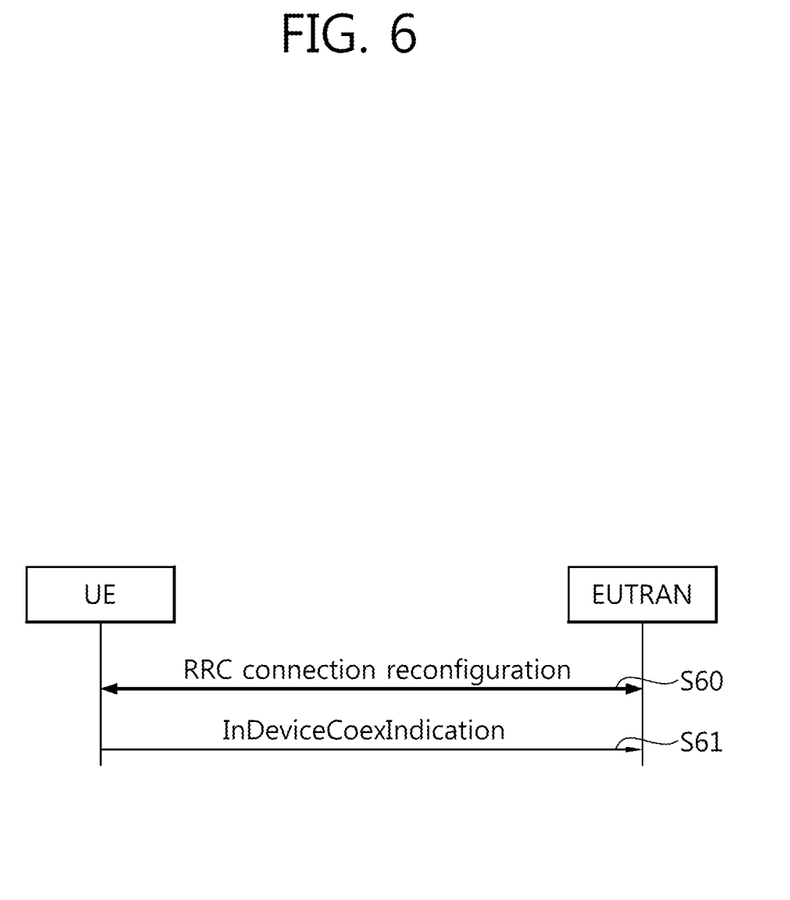
FIG. 6 shows an example of an IDC indication procedure.

During handover, if the RRCConnectionReconfiguration message includes the mobilityControlInfo and the UE is able to comply with the configuration included in this message, the UE shall:

1> if the RRCConnectionReconfiguration message includes the idc-Config:

2> perform the In-device coexistence indication procedure;

During reconfiguration, if the UE is able to comply with the configuration included in the RRCConnectionReconfiguration message, the UE shall:

1> if the RRCConnectionReconfiguration message includes the idc-Config:

2> perform the In-device coexistence indication procedure;

FIG. 6 shows an example of an IDC indication procedure. The purpose of this procedure is to inform the E-UTRAN about (a change of) the IDC problems experienced by the UE in RRC_CONNECTED and to provide the E-UTRAN with information in order to resolve them. It is for further study how radio resource management (RRM)/radio link management (RLM)/channel state information (CSI) measurements in different phases of IDC interference are captured.

Referring to FIG. 6, at step S60, the UE and the E-UTRAN performs an RRC connection reconfiguration procedure. At step S61, the UE transmits an IDC indication (InDeviceCoexIndication) message to the E-UTRAN.

A UE in RRC_CONNECTED shall:

1> if the received otherConfig includes the idc-Config set to setup:

2> if on one or more frequencies for which a measObjectEUTRA is configured, the UE is experiencing IDC problems that it cannot solve by itself:

3> initiate the transmission of the InDeviceCoexIndication message;

2> if since the last transmission of the InDeviceCoexIndication message:

3> if no frequency is any longer experiencing IDC problems as reported in the last InDeviceCoexIndication message; or 3> if the set of frequencies for which a measObject-EUTRA is configured and on which the UE is experiencing IDC problems that it cannot solve by itself, has changed; or 3> if for one or more of the frequencies in this set of frequencies, the interferenceDirection has changed; or 3> if the time division multiplexing (TDM) assistance information has changed:

4> initiate the transmission of the InDeviceCoexIndication message.

It is for further study how the IDC indication prohibit timer is captured.

The UE shall set the contents of the InDeviceCoexIndication message as follows:

1> if there is at least one E-UTRA carrier frequency affected by the IDC problems:

2> include the IE affectedCarrierFreqList with an entry for each affected E-UTRA carrier frequency for which a measurement object is configured;

2> for each E-UTRA carrier frequency included in the IE affectedCarrierFreqList, include interferenceDirection and set it accordingly;

2> include TDM based assistance information:

3> if the UE has DRX related assistance information that could be used to resolve the IDC problems:

4> include drx-CycleLength, drx-Offset and drx-ActiveTime;

3> else if the UE has desired subframe reservation patterns related assistance information that could be used to resolve the IDC problems:

4> include idc-SubframePatternList.

When transmitting an InDeviceCoexIndication message to inform the E-UTRAN the IDC problems, the UE includes all assistance information (rather than providing e.g. the changed part(s) of the assistance information). And, when transmitting an InDeviceCoexIndication message to inform the E-UTRAN the IDC problem is over, the UE does not include the IE affectedCarrierFreqList and tdm-AssistanceInfo.

The UE shall submit the InDeviceCoexIndication message to lower layers for transmission.

Table 4 shows an example of the InDeviceCoexIndication message. A signalling radio bearer for the InDeviceCoexIndication message may be an SRB1, and a logical channel on which the InDeviceCoexIndication message is transmitted may be a DCCH.

TABLE 4

```
-- ASN1START
InDeviceCoexIndication-r11 ::= SEQUENCE {
criticalExtensions CHOICE {
c1 CHOICE {
inDeviceCoexIndication-r11 InDeviceCoexIndication-r11-IEs,
                spare3 NULL, spare2 NULL, spare1 NULL
},
criticalExtensionsFuture SEQUENCE { }
}
}
InDeviceCoexIndication-r11-IEs ::= SEQUENCE {
affectedCarrierFreqList-r11 AffectedCarrierFreqList-r11 OPTIONAL,
tdm-AssistanceInfo-r11 TDM-AssistanceInfo-r11 OPTIONAL,
lateNonCriticalExtension OCTET STRING OPTIONAL,
nonCriticalExtension SEQUENCE { } OPTIONAL
}
AffectedCarrierFreqList-r11 ::= SEQUENCE
(SIZE   (1..maxFreqIDC-r11))    OF
AffectedCarrierFreq-r11
AffectedCarrierFreq-r11 ::= SEQUENCE {
carrierFreq-r11 MeasObjectId,
interferenceDirection-r11 ENUMERATED {eutra, other, both, spare}
}
```

TABLE 4-continued

```
TDM-AssistanceInfo-r11 ::= CHOICE {
drx-AssistanceInfo-r11 SEQUENCE {
drx-CycleLength-r11 ENUMERATED {n1} OPTIONAL,
drx-Offset-r11 ENUMERATED {n1} OPTIONAL,
drx-ActiveTime-r11 ENUMERATED {n1}  OPTIONAL -- The above three parameters
(i.e. drx-CycleLength-r11, drx-Offset-r11 and
-- drx-ActiveTime-r11) are FFS and need to be discussed
},
idc-SubframePattern-r11 SEQUENCE {
idc-SubframePatternList-r11 IDC-SubframePatternList-r11
},
}
IDC-SubframePatternList-r11 ::=    SEQUENCE
(SIZE   (1..maxSubframePatternIDC-r11)) OF IDC-SubframePattern-r11
IDC-SubframePattern-r11 ::= CHOICE {
subframePatternFDD-r11 BIT STRING (SIZE (40)),
subframePatternTDD-r11 CHOICE {
subframeConfig0-r11 BIT STRING (SIZE (70)),
subframeConfig1-5-r11 BIT STRING (SIZE (10)),
subframeConfig6-r11 BIT STRING (SIZE (60))
},
...
}
-- ASN1STOP
```

As described above, the powerPrefIndication-Timer is set for the transmission of the UEAssistanceInformation message including the powerPrefIndication. That is, while the timer T340 is running, the transmission of the UEAssistanceInformation message including the powerPrefIndication is prohibited for reducing signaling overhead. However, how a UE handles a running prohibit timer is not determined upon reception of an RRC reconfiguration message, yet. Accordingly, a method for configuring a prohibit timer while the previously configured prohibit timer is running.

According to an embodiment of the present invention, the UE receives a first configuration, configures a UE originated indication with the first configuration, transmits the UE originated indication, starts a timer prohibiting another UE originated indication, receives a second configuration, and configures the UE originated indication with the second configuration after the timer is expired.

Figure 7:
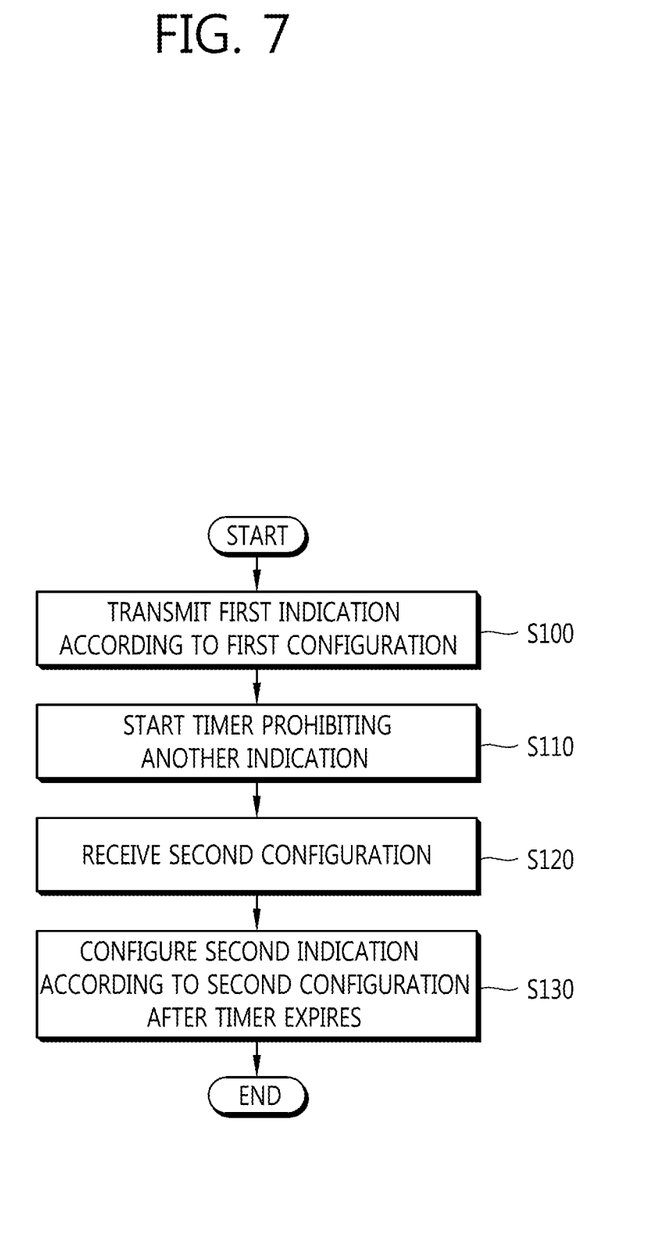
FIG. 7 shows an example of configuring a timer according to an embodiment of the present invention.

FIG. 7 shows an example of configuring a timer according to an embodiment of the present invention.

At step S100, the UE transmits a first indication according to a first configuration. At step S110, the UE starts a timer prohibiting transmission of another indication. At step S120, the UE receives a second configuration. At step S130, the UE configures a second indication according to the second configuration after the timer expires.

The first configuration and the second figuration may include a timer. The timer expires when running time of the timer reaches a value of the timer. The second configuration may be received while the timer included in the first configuration is running.

In addition, the first indication and the second indication are one of a power preference indication, an IDC indication, a proximity indication, and an MBMS interest indication.

Alternatively, when the second configuration is received at step S120 above, the UE may stop the timer, and may configure the second indication according to the second configuration.

Alternatively, when the second configuration is received at step S120 above, the UE may configure the second indication according to the second configuration, and may stop the timer when the running time of the timer reaches the timer value included in the second configuration.

According to the embodiment of the present invention, the UE behavior is described as follows. For convenience of the description below, the power preference indication is exemplified, but the embodiment of the present invention is not limited thereto. The embodiment of the present invention described below may be applied to any other UE-originated indication, such as the IDC indication, proximity indication or MBMS interest indication. Namely, the powerPrefIndicationConfig described below may be replaced by any configuration of the IDC indication, proximity Indication or MBMS interest indication. Also, the powerPrefIndication-Timer described below may be replaced by any configuration of a prohibit timer value used for the IDC indication, proximity Indication or MBMS interest indication.

A UE capable of providing power preference indications in RRC_CONNECTED may initiate the procedure only if:
1> the UE did not indicate any power saving preference to the network since the UE has configured the powerPrefIndicationConfig, or the current UE preference is different from the one indicated in the last transmission of the UEAssistanceInformation message to the network; and
1> timer T340 is not running.

Upon initiating the procedure, the UE shall:
1> start timer T340 with the timer value set to the powerPrefIndication-Timer;
1> initiate transmission of the UEAssistanceInformation message;

If the UE receives the RRCConnectionReconfiguration message (including or not including the mobilityControlInfo) and the UE is able to comply with the configuration included in this message, the UE shall:
1> if the powerPrefIndicationConfig has been previously configured; and
1> if the received RRCConnectionReconfiguration message does not include the powerPrefIndicationConfig:
2> if timer T340 is running:
3> continues to run T340; or
3> stops T340;
2> perform the power preference indication procedure;
1> if the received RRCConnectionReconfiguration message includes the powerPrefIndicationConfig; and
1> if the powerPrefIndicationConfig includes the powerPrefIndication-Enabled:
2> if the powerPrefIndicationConfig is not configured, but if timer T340 is running:
3> (Alternative C1) stops T340 and then applies the received powerPrefIndicationConfig; or
3> (Alternative C2) applies the received powerPrefIndicationConfig to the running timer T340 as specified in subsection 1 to be described below; or
3> (Alternative C3) continues to run T340, and then applies the received powerPrefIndicationConfig after the timer T340 is expired.
2> if the powerPrefIndicationConfig is not configured, and if timer T340 is not running:
3> applies the received powerPrefIndicationConfig;
2> if the powerPrefIndicationConfig has been previously configured, and if timer T340 is running:
3> (Alternative B1) stops T340, releases the previously configured powerPrefIndicationConfig, and then applies the received powerPrefIndicationConfig; or
3> (Alternative B2) releases the previously configured powerPrefIndicationConfig, and then applies the received powerPrefIndicationConfig to the running timer T340 as specified in subsection 1 to be described below; or
3> (Alternative B3) continues to run T340, and then applies the received powerPrefIndicationConfig after the timer T340 is expired, as specified in subsection 2 to be described below.
2> if the powerPrefIndicationConfig has been previously configured, and if timer T340 is not running:
3> releases the previously configured powerPrefIndicationConfig; and
3> applies the received powerPrefIndicationConfig;
2> perform the power preference indication procedure;

For subsection 1, handling of running timer T340 is as follows. Upon receiving the powerPrefIndicationConfig including the powerPrefIndication-Timer, the UE shall:
1> if timer T340 is running:
2> the current running time of T340 is equal to or more than the received powerPrefIndication-Timer:
3> stop T340;
2> the current running time of T340 is less than the received powerPrefIndication-Timer:
3> continue to run T340 up to the received powerPrefIndication-Timer.

For subsection 2, handling of running timer T340 may follow one of two options described below.
1) Upon receiving the powerPrefIndicationConfig including the powerPrefIndication-Timer, the UE shall:
1> if timer T340 is running:
2> continue to run T340 up to the previously configured powerPrefIndication-Timer;
If timer T340 is expired, the UE shall:
1> releases the previously configured powerPrefIndicationConfig; and
1> applies the received powerPrefIndicationConfig;
2) Upon receiving the powerPrefIndicationConfig including the powerPrefIndication-Timer, the UE shall:
1> if timer T340 is running:
2> continue to run T340 up to the previously configured powerPrefIndication-Timer;
1> releases the previously configured powerPrefIndicationConfig except the previously configured powerPrefIndication-Timer; and
1> applies the received powerPrefIndicationConfig except the received powerPrefIndication-Timer;
If timer T340 is expired, the UE shall:
1> releases the previously configured powerPrefIndication-Timer; and
1> applies the received powerPrefIndication-Timer;

According to the embodiment of the present invention, the previously configured prohibit timer may operate clearly upon reception of another prohibit timer configuration.

According to another embodiment of the present invention, the UE configures a UE originated indication, starts a timer prohibiting another UE originated indication while staying at a cell of a first type of mobile system, receives a command for handover to another cell of a second type of mobile system, and stop the timer for the handover. The first type of mobile system may be an LTE system (i.e. E-UTRA), and the second type of mobility system may be a non-LTE system such as UTRA, GERAN, CDMA2000 or Wi-Fi.

According to the another embodiment of the present invention, the UE behavior is described as follows. If the UE receives the handover command for inter-RAT handover to UTRA, GERAN, CDMA2000 or Wi-Fi, and the UE is able to comply with the configuration included in this message, the UE shall:
1> (Alternative D1) stops T340; or
1> (Alternative D2) continue to run T340 up to the previously configured powerPrefIndication-Timer; or 1> (Alternative D3) suspends T340 and then, resume T340 upon inter-RAT handover to a E-UTRA cell (LTE cell).

In addition, if the UE receives the handover command for inter-RAT handover to UTRA, GERAN, CDMA2000 or Wi-Fi, and the UE is able to comply with the configuration included in this message, the UE shall:

1> keeps maintaining the previously configured power-PrefIndicationConfig; or

1> releases the previously configured powerPrefIndicationConfig;

When the source cell prepares handover of the UE to the target cell, the source cell transmit the PowerPrefIndication that it received from the UE to the target cell. The source cell transmits the PowerPrefIndication to the target cell over X2 interface via the AS-context IE. The target cell uses the received PowerPrefIndication for the UE.

Table 5 shows an example of the AS-context IE.

TABLE 5

-- ASN1START
AS-Context ::= SEQUENCE {
reestablishmentInfo ReestablishmentInfo OPTIONAL -- Cond HO
}
AS-ContextExtension-r11 ::= SEQUENCE {
idc-Context-r11 IDC-Context-r11 OPTIONAL, -- Cond HO
uai-Context-r11 UAI-Context-r11 OPTIONAL, -- Cond HO
...
}
-- ASN1STOP Referring to Table 5, the AS-context IE includes the uai-Context IE. The uai-Context IE includes UE assistance information including the UE's power saving preference.

Table 6 shows an example of the uai-Context IE.

TABLE 6

-- ASN1START
UAI-Context-r11 ::= SEQUENCE {
powerPrefIndication-r11 PowerPrefIndication-r11 OPTIONAL,
...
}
-- ASN1STOP Referring to Table 6, 'default' indicates the UE preference for a default configuration for power saving. 'lowpowerconsumption' indicates the UE preference for a configuration that is primarily optimized for power saving.

To summarize the description above according to embodiments of the present invention, UE behaviors are as follows.

Case 1: Upon Receiving the Reconfiguration Message Including the Configuration Enabling and Configuring the UE-Originated Indication Transmission If the prohibit timer has been running when upon receiving the reconfiguration message including the configuration, the UE may apply the configuration such as prohibit timer value immediately according to the received reconfiguration message. Upon reception of the configuration, the prohibit timer stops or expires. Or, if the current running time of the running prohibit timer is equal to or more than the applied prohibit timer value, the UE stops the running prohibit timer. Namely, the running prohibit timer expires upon reception of the reconfiguration message including the configuration. If the current running time of the running prohibit timer is less than the applied prohibit timer value, the UE continues to run the prohibit timer. The running prohibit timer expires when the running time of the running prohibit timer reaches the applied prohibit timer value.

Alternatively, the running prohibit timer may continue to run until the prohibit timer is expired even after the reconfiguration message including the configuration is received. The UE may apply the configuration such as prohibit timer value not immediately upon reception of the reconfiguration message, but after this running prohibit timer is expired. The prohibit timer expires according to the previous configuration included in the previous reconfiguration message that the UE has received before this reconfiguration message. If another new prohibit timer is triggered after the prohibit timer has expired, the UE starts the new prohibit timer.

Case 2: During Handover

Upon receiving the handover command, if the handover command does not include the configuration enabling and configuring UE-originated indication transmission, and if the prohibit timer is already running when upon receiving the handover command, the prohibit timer may continue to run according to the existing configuration during and after the handover. The configuration included in the previous reconfiguration message that the UE has received before this handover command message continues to be valid in the UE during and after handover. The prohibit timer expires according to the configuration included in the previous reconfiguration message that the UE has received before this handover command message.

Alternatively, upon reception of the handover command, the prohibit timer may stop or expire.

Alternatively, the UE may suspends the running prohibit timer but the prohibit timer is assumed to be running (to prevent UE-originated indication transmission) until completion of the handover. Upon the completion of the handover, the UE resumes the prohibit timer. The configuration included in the previous reconfiguration message that the UE has received before this handover command message continues to be valid in the UE during and after handover. The prohibit timer expires according to the configuration included in the previous reconfiguration message that the UE has received before this handover command message.

Else, if the handover command (i.e. RRC connection reconfiguration message including mobility control info) includes the configuration enabling UE-originated indication transmission, the UE may follow the UE behaviors as described in case 1.

Case 3: During Re-Establishment

Upon re-establishment, if the prohibit timer has been running, the UE may stop the prohibit timer, and the UE may disable UE-originated indication transmission.

Alternatively, the UE may continue to run the prohibit timer during and after the re-establishment. The UE originated indication is being enabled during and after the re-establishment.

Alternatively, the UE may stop the prohibit timer, but the UE-originated indication is being enabled during and after the re-establishment.

Alternatively, the UE may suspend the running prohibit timer but the prohibit timer is assumed to be running (to prevent UE-originated indication transmission) until completion of the re-establishment. Upon the completion of the re-establishment, the UE resumes the prohibit timer. The UE-originated indication is being enabled during and after the re-establishment. The configuration included in the reconfiguration message that the UE has received before this re-establishment continues to be valid in the UE during and after re-establishment. The prohibit timer expires according to the configuration included in the previous reconfiguration message that the UE has received before this re-establishment.

Else, the UE may disable UE-originated indication transmission, or the UE-originated indication is being enabled during and after the re-establishment When the re-establishment fails, the UE stops the prohibit timer and the UE disables UE-originated indication transmission.

Figure 8:
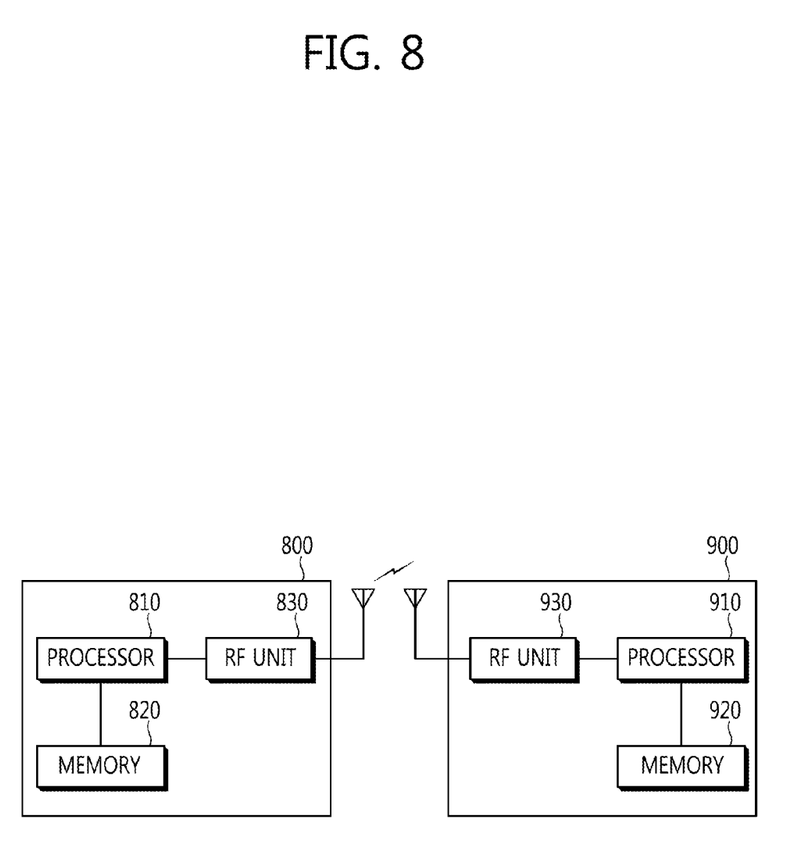
FIG. 8 is a block diagram showing wireless communication system to implement an embodiment of the present invention.

FIG. 8 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting one or more indications by a user equipment (UE) in a wireless communication system, the method comprising:
   receiving, by the UE, a first configuration related to a transmission of a first indication;
   transmitting, by the UE, the first indication according to the received first configuration;
   starting, by the UE, a prohibit timer that prohibits a transmission of an indication other than the first indication while the UE stays at a cell of a first type of mobile system;
   receiving, by the UE, a handover command to perform a handover to a cell of a second type of mobile system,
   wherein the first type of mobile system is a long-term evolution (LTE) related system, and the second type of mobile system is a non-LTE related system;
   stopping, by the UE, the prohibit timer due to the handover;
   receiving, by the UE, a second configuration related to a transmission of a second indication; and
   transmitting, by the UE, the second indication according to the received second configuration after the prohibit timer is stopped;
   wherein the first indication and the second indication are one of a power preference indication, an in-device coexistence, IDC, indication, a proximity indication, and a multimedia broadcast multicast services, MBMS, interest indication.

2. The method of claim 1, wherein each of the first configuration and the second configuration includes a respective timer value for the prohibit timer.

3. The method of claim 2, wherein the second configuration is received while the prohibit timer included in the first configuration is running.

4. The method of claim 1, wherein the first configuration and the second configuration are received via an RRC connection reconfiguration message.

5. The method of claim 1, wherein the first indication is transmitted via a dedicated control channel, DCCH.

6. The method of claim 1, wherein the UE is in a radio resource control, RRC, connected mode.

7. A user equipment (UE) for transmitting one or more indications in a wireless communication system, the UE comprising:
   a radio frequency (RF) unit that transmits and receives radio signal signals; and
   a processor, coupled to the RF unit, that:
   controls the RF unit to receive a first configuration related to a transmission of a first indication;
   controls the RF unit to transmit the first indication according to the received first configuration;
   starts a prohibit timer that prohibits a transmission of an indication other than the first indication while the UE stays at a cell of a first type of mobile system;
   controls the RF unit to receive a handover command to perform a handover to a cell of a second type of mobile system,
   wherein the first type of mobile system is a long-term evolution (LTE) related system, and the second type of mobile system is a non-LTE related system;
   stops the prohibit timer for the handover;
   controls the RF unit to receive a second configuration related to a transmission of a second indication: and
   controls the RF unit to transmit the second indication according to the received second configuration after the prohibit timer is stopped;
   wherein the first indication and the second indication are one of a power preference indication, an in-device coexistence, IDC, indication, a proximity indication, and a multimedia broadcast multicast services, MBMS, interest indication.

8. The UE of claim 7, wherein each of the first configuration and the second configuration includes a respective timer value for the prohibit timer.

9. The UE of claim 8, wherein the second configuration is received while the prohibit timer included in the first configuration is running.

10. The UE of claim 7, wherein the first configuration and the second configuration are received via an RRC connection reconfiguration message.

11. The UE of claim 7, wherein the first indication is transmitted via a dedicated control channel, DCCH.

12. The UE of claim 7, wherein the UE is in a radio resource control, RRC, connected mode.

* * * * *